United States Patent [19]

Shults

[11] Patent Number: 5,102,599
[45] Date of Patent: Apr. 7, 1992

[54] METHOD OF AND APPARATUS FOR CUTTING TAILS OF VISCOUS MATERIAL

[75] Inventor: Walter E. Shults, Scotia, N.Y.

[73] Assignee: General Electric Company, Waterford, N.Y.

[21] Appl. No.: 614,970

[22] Filed: Nov. 19, 1990

Related U.S. Application Data

[63] Continuation of Ser. No. 373,675, Jun. 28, 1989, abandoned, which is a continuation of Ser. No. 121,985, Nov. 18, 1987, abandoned.

[51] Int. Cl.[5] .................. B29C 47/00; B29C 69/00
[52] U.S. Cl. .................................. 264/142; 83/23;
  83/109; 83/167; 83/435.1; 83/491; 83/651.1;
  141/2; 141/18; 141/318; 222/80; 264/148;
  264/163; 264/297.1; 264/297.6; 425/297;
  425/308; 425/325
[58] Field of Search .............. 264/138, 141, 142, 143,
  264/145, 148, 163, 211.12, 297.1, 297.6;
  425/297, 308, 311, 325, 806; 141/2, 18, 318;
  222/80; 83/23, 109, 167, 435.1, 469, 491, 651.1

[56] References Cited

U.S. PATENT DOCUMENTS

| | | | |
|---|---|---|---|
| 3,405,215 | 10/1968 | Caldwell | 264/263 |
| 3,414,938 | 12/1968 | Caviglia | 425/297 X |
| 3,424,832 | 1/1969 | Chisholm | 264/143 |
| 4,009,235 | 2/1977 | Bober | 264/141 X |
| 4,021,176 | 5/1977 | Dettmer et al. | 264/141 X |
| 4,205,030 | 5/1980 | Menshutin et al. | 264/141 X |
| 4,401,238 | 8/1983 | Marchadour | 222/80 |
| 4,492,550 | 1/1985 | Levine | 425/308 X |
| 4,729,413 | 3/1988 | Shults | 141/2 |
| 4,735,761 | 4/1988 | Lindenberger | 264/297.6 X |

FOREIGN PATENT DOCUMENTS 806434  5/1981  U.S.S.R. ..................... 425/308

Primary Examiner—Leo B. Tentoni

[57] ABSTRACT

A rotating blade is passed beneath an extruder nozzle and employed to cut tails of viscous materials which have been extruded.

12 Claims, 1 Drawing Sheet

METHOD OF AND APPARATUS FOR CUTTING TAILS OF VISCOUS MATERIAL

The present application is a combination of United States patent application Ser. No. 07/373,675, filed June 28, 1989 now abandoned, which is a continuation of United States patent application Ser. No. 07/121,985 filed Nov. 18, 1987 now abandoned.

The present invention relates to a method for cutting tails of viscous material which result upon separation when the material is divided into portions for packaging or other purposes. More particularly, the present invention relates to a method for cutting tails where viscous material is divided into portions by an injection device which is vertically aligned above the point of injection.

BACKGROUND OF THE INVENTION

Processing and packaging viscous materials, such as oil, glue, caulking, toothpaste, syrup, etc. have presented unique problems to the industries which are faced with these tasks. Pumps, tanks, lines, injectors and packages must all be designed considering the properties of the viscous material in question.

A particular property of such materials addressed herein is the tendency of the materials to form tails. For example, when a viscous material is divided into portions, such as by extruding a set portion from a nozzle, the material will resist separation and form a tail from the nozzle to the bulk of the portion extruded. This tail will break and drop material on machinery and packaging necessitating time consuming clean up. Experience herein is derived as shown in U.S. Pat. No. 4,729,413, issued Mar. 8, 1988, from filling tubes of silicone sealant which, like many viscous materials is packaged by extruding from a nozzle vertically inserted into a package and withdrawn as material is extruded. The silicone sealant will form a tail between the sealant in the package and the nozzle when it is completely withdrawn. The tail will break and fall, clogging machinery or soiling the package.

It is an object of the present invention to cut tails of viscous material to avoid clogging machinery and soiling packages.

It is another object of the present invention to cut the tail on a vertically aligned filling device by a method that the tail will drop substantially along its axis and to its point of origin.

It is another object to cut tails without imparting substantial momentum to the bulk material of the tail.

SUMMARY OF THE INVENTION

Briefly, there is provided by the present invention a method for cutting vertically aligned tails of viscous materials comprising:

(a) contacting a tail at a point with a rotating blade, the blade rotating at sufficient speed and having a sufficiently small thickness at said point to pass through the tail without imparting substantial momentum to the bulk of the tail, and (b) passing the blade through the tail whereby the bulk of the tail falls in a substantially vertical direction.

DETAILED DESCRIPTION OF THE INVENTION

Viscous materials herein include acrylic sealant, silicone sealant, toothpaste, oil, grease, glue, paint, syrup, honey, chocolate, etc. The required characteristic of the material is that it have sufficient viscosity and sufficient degree of fluid character that tails result when portions of material are separated. Whether or not a material forms a tail is a function of several rheological properties but primarily viscosity. Herein the viscous material might have a viscosity ranging from about 250 to 200,000,000 centipoise at 25° C.

Figure 1:
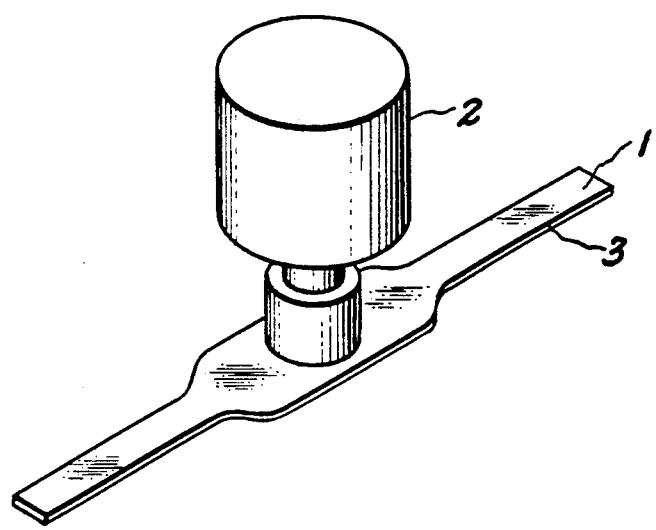
FIG. 1 is an isometric view of a blade for cutting tails.

As seen in FIG. 1, the blade 1 attached to motor 2 comprises a surface 3 for contact with a tail 7 to pass through the tail 7 as appropriate. The blade 1 may be a metal or plastic bar as shown or it may be a solid or flexible rod or cord. The contact surface 3 may be sharpened or not depending on the thickness of the tail, the material involved, the speed of rotation, etc. Thickness of blade 1 should be sufficiently small so that it may pass through the tail without imparting substantial momentum to the bulk of the tail at reasonable blade rotational speeds. Typically the thickness of blade 1 might range from 1 to 125 mil and preferably from about 2 to 60 mil. Length of the blade 1 might range from 2 to 12 inches providing a reach of from 1 to 6 inches.

The instant invention is especially suitable for processing or packaging machinery which handles viscous material in vertical alignment. Vertical alignment herein means that the machine deposits a portion of viscous material in a position below the axis of withdrawing the extruder nozzle or source. Functionally this means that for some brief time the tail will be positioned over the deposited portion and if cut would fall onto the deposited portion.

Figure 2:
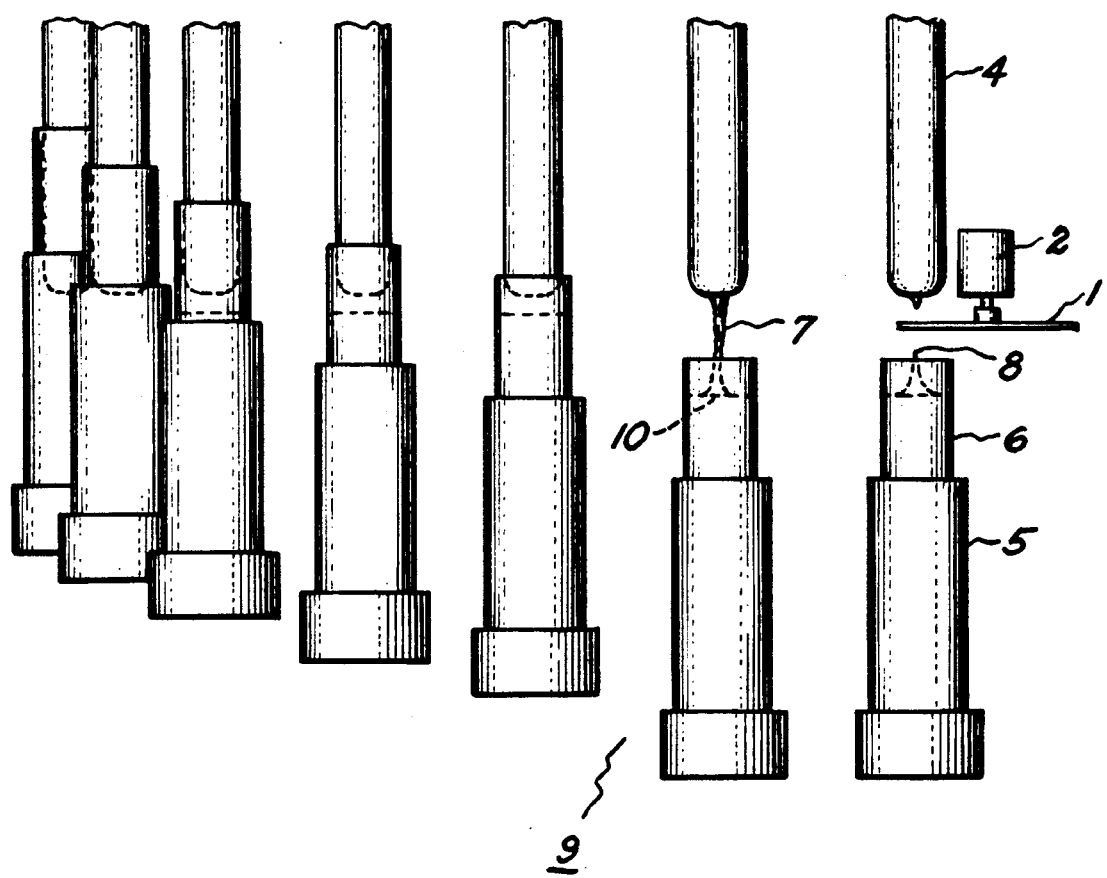
FIG. 2 is a view of a blade positioned on a rotary filler to cut tails.

FIG. 2 depicts a rotary filler 9 with multiple extruder nozzles 4 filling packages 6 carried in transport pucks 5 with viscous material 10. The extruder nozzle 4 is vertically inserted into package 6 where a controlled portion of viscous material 10 is extruded. In the particular instance shown extruder nozzle 4 is slowly withdrawn as viscous material 10 is extruded to fill the entire length of the elongated package 6. During the filling process both package 6 and extruder nozzle 4 are rotated through approximately 270° about the axis of rotary filler 9.

Once extruded viscous material 10 and extruder nozzle 4 are vertically separated forming tail 7. Prior to interrupting this vertical alignment, blade 1, rotating, passes between extruder nozzle 4 and viscous material 10 causing tail 7 to be cut. Bulk tail 8 falls to collect with viscous material 10.

It is critical herein that blade 1 rotate with sufficient speed so that at reasonable thickness it can pass through and cut the tail 7 without imparting substantial momentum to the bulk of the tail at reasonable blade thicknesses. That is to say that when cut by the blade 1, bulk tail 8 should fall in a substantially vertical direction to collect with viscous material 10. A blade 1 which rotates too slowly will drag tail 7 along and prevent a vertical fall. Typically blade 1 will rotate at from 200 to 6,000 rpm. Of course, the upper boundary is not critical except that should blade 1 spin at too high a rate it will pose a safety hazard of flying material.

The plane of rotation of blade 1 should be substantially horizontal and blade 1 should pass sufficiently close to the extruder nozzle 4 that the tail is cut short.

By cutting the tail short is meant that the viscous material remaining on the extruder nozzle 4 is not substantial so as to form a new tail or is of as small amount as possible. Herein it is recommended that blade 1 pass within from 1/16 to ¼ of an inch of extruder nozzle 4.

Subsequent to cutting tail 7 the vertical alignment of extruder nozzle 4 and viscous material 10 may be disturbed. In the case of a rotary filler, the package 6 is carried away in transport puck 5 while extruder nozzle 4 is vertically inserted into a second package 6.

The instant invention is suitable for use with other materials handling machines than a rotary filler. For example, chocolate toppings could be extruded onto candy centers and a rotating blade employed to control tails of chocolate.

Further, the rotating blade need not be fixed as exemplified herein. An arm could be used to move the blade as necessary to access a tail.

It is apparent that tails of viscous material contribute directly to unsuitable and out of specification product. Further, tails of material lead to unnecessary maintenance and downtime. By employing the invention disclosed herein expensive machinery can become both more productive and more reliable.

Other embodiments will occur to those skilled in the art.

What is claimed is:

1. A method for cutting vertically aligned tails of viscous material having a viscosity of from about 250 to 200,000,000 centipoise at 25° C., comprising the steps of:
   (a) extruding the viscous material through an extruder nozzle and into a package,
   (b) vertically separating the extruder nozzle and viscous material whereby a tail is formed, followed by,
   (c) contacting said tail at a point with a rotating blade, the blade rotating at a speed of 200 to 6,000 rpm and having a thickness of 1 to 125 mil at said point, the blade passing through the tail without imparting substantial momentum to the bulk of the tail, and
   (d) passing the blade through the tail whereby the bulk of the tail falls in a substantially vertical direction onto the extruded viscous material.

2. The method of claim 1 wherein said blade is a metal or plastic bar.

3. The method of claim 1 wherein said blade is a stiff or flexible rod.

4. The method of claim 1 wherein said blade is a stiff or flexible chord.

5. The method of claim 1 wherein said blade has a length of from 2 to 12 inches.

6. The method of claim 1 wherein said tail is cut short at from about 1/16 to ¼ inches.

7. A device for extruding viscous material having a viscosity of from about 250 to 200,000,000 centipoise at 25° C., comprising:
   (i) at least one extruder nozzle vertically aligned above an area to deposit viscous material, a tail being formed by the vertical separation of the extruder nozzle and the extruded viscous material, and
   (ii) a blade rotating at a speed of 200 to 6,000 rpm is a substantially horizontal plane and mounted to pass beneath at least one extruder nozzle so as to come into contact with the tail formed upon vertical separation of the extruder nozzle and the extruded viscous material, the blade having a thickness of 1 to 125 mil at the point of contact between the blade and the tail, the blade passing through the tail without imparting substantial momentum to the bulk of the tail, whereby the bulk of the tail falls in a substantially vertical direction onto the extruded viscous material.

8. The device of claim 7 wherein said blade is a metal or plastic bar.

9. The device of claim 7 wherein said blade is a stiff or flexible rod.

10. The device of claim 7 wherein said blade is a stiff or flexible chord.

11. The device of claim 7 wherein said blade has a length of from 2 to 12 inches.

12. The device of claim 7 wherein said tail is cut short at from about 1/16 to ¼ inches.

* * * * *